(12) United States Patent
Guillier

(10) Patent No.: US 11,377,159 B2
(45) Date of Patent: Jul. 5, 2022

(54) VEHICLE PART INTENDED TO BE WELDED TO A BODYWORK ELEMENT

(71) Applicant: COMPAGNIE PLASTIC OMNIUM, Lyons (FR)

(72) Inventor: Stéphane Guillier, Dagneux (FR)

( * ) Notice: Subject to any disclaimer, the term of this patent is extended or adjusted under 35 U.S.C. 154(b) by 583 days.

(21) Appl. No.: 16/473,351

(22) PCT Filed: Dec. 7, 2017

(86) PCT No.: PCT/FR2017/053443
§ 371 (c)(1),
(2) Date: Jun. 25, 2019

(87) PCT Pub. No.: WO2018/122481
PCT Pub. Date: Jul. 5, 2018

(65) Prior Publication Data
US 2020/0122785 A1     Apr. 23, 2020

(30) Foreign Application Priority Data

Dec. 26, 2016    (FR) ........................................ 1663388

(51) Int. Cl.
*B62D 29/04*        (2006.01)
*B60J 5/10*          (2006.01)
(Continued)

(52) U.S. Cl.
CPC ................ *B62D 29/04* (2013.01); *B60J 5/10* (2013.01); *B60R 19/03* (2013.01); *B62D 29/048* (2013.01);
(Continued)

(58) Field of Classification Search
CPC .... B60J 5/10; B60J 5/107; B60J 5/108; B60R 19/03; B60R 2019/1853;
(Continued)

(56) References Cited

U.S. PATENT DOCUMENTS 5,228,742 A * 7/1993 Johnson ............... B62D 29/048
296/183.1
5,947,540 A * 9/1999 Pariseau ............... B62D 33/023
296/57.1

(Continued)

FOREIGN PATENT DOCUMENTS

JP       H02-171358 A    7/1990
WO    WO 2007/036440 A1   4/2007

OTHER PUBLICATIONS

PCT/FR2017/053443 International Preliminary Report on Patentability Chapter I dated Jul. 2, 2019.
(Continued)

*Primary Examiner* — Gregory A Blankenship
(74) *Attorney, Agent, or Firm* — Anglehart et al.

(57) ABSTRACT

A part of a motor vehicle is made from plastic material and includes at least one wall configured to be welded to a bodywork element. The wall includes at least one protruding element defining a weld surface configured to form a point of contact with said bodywork element. The part includes, around the protruding element, at least one stress relief area for relieving stresses experienced by the protruding element.

20 Claims, 3 Drawing Sheets

(51) Int. Cl.
  *B60R 19/03*    (2006.01)
  *B62D 35/00*    (2006.01)
  *B62D 33/027*   (2006.01)

(52) U.S. Cl.
  CPC ....... *B62D 33/0273* (2013.01); *B62D 35/007* (2013.01); *B62D 35/00* (2013.01)

(58) Field of Classification Search
  CPC ............ B60R 2019/1833; B62D 29/04; B62D 29/045; B62D 29/048; B62D 35/00; B62D 35/007; B62D 33/023; B62D 33/0273; B62D 33/03
  See application file for complete search history.

(56) References Cited

U.S. PATENT DOCUMENTS

| | | | | |
|---|---|---|---|---|
| 7,556,285 | B1* | 7/2009 | Hayashi | B60R 21/2165 |
| | | | | 280/728.3 |
| 7,819,452 | B2* | 10/2010 | Fuchs | F16B 11/006 |
| | | | | 156/60 |
| 2012/0013147 | A1 | 1/2012 | Ezaka et al. | |
| 2012/0061992 | A1* | 3/2012 | Ezaka | B29C 66/1122 |
| | | | | 296/180.1 |
| 2012/0306231 | A1* | 12/2012 | Ginestet | B60J 5/101 |
| | | | | 296/76 |
| 2014/0070563 | A1* | 3/2014 | Kurata | B29C 66/545 |
| | | | | 296/180.1 |
| 2014/0145470 | A1* | 5/2014 | Preisler | B62D 29/04 |
| | | | | 52/309.1 |
| 2015/0360734 | A1* | 12/2015 | McKinney | B62D 35/00 |
| | | | | 296/180.1 |
| 2016/0264082 | A1* | 9/2016 | Berger | B29C 44/5681 |
| 2017/0369105 | A1* | 12/2017 | Pickett | B29C 66/54 |
| 2018/0104904 | A1* | 4/2018 | Chaaya | B29C 65/1419 |
| 2019/0248424 | A1* | 8/2019 | McKinney | B60R 13/01 |
| 2019/0366813 | A1* | 12/2019 | Grond-Soons | B60J 5/101 |

OTHER PUBLICATIONS

PCT/FR2017/053443 International Search Report with English translation dated Mar. 8, 2018.
PCT/FR2017/053443 Search Strategy dated Mar. 8, 2018.
PCT/FR2017/053443 Written Opinion of the International Searching Authority with English translation dated Mar. 8, 2018.

* cited by examiner

VEHICLE PART INTENDED TO BE WELDED TO A BODYWORK ELEMENT

The invention relates to the field of parts for the automotive industry comprising at least one part made from plastic material.

More precisely, the invention concerns a part intended to be attached, by welding, to a bodywork element.

Various solutions have already been proposed to attach a part made from plastic material to another part made from plastic material acting as bodywork element. The part to be attached can be a support for a functional member of the vehicle, such as for example a sensor, or a reinforcement such as a spoiler reinforcement attached to a spoiler outer surface. The known solutions use rivets, screws, clips, and especially bonding and welds.

Among these solutions, some do not impair the outer appearance of the element supporting the part, by avoiding in particular heat marks or visible attachment means. This is especially important when the bodywork element supporting the part to be attached is a visible part, the part to be attached possibly being a reinforcement.

To weld such a part forming a reinforcement to a visible part, this part is designed with protruding elements, forming a protrusion, in order to make a contact between the two parts to be welded.

To make this contact, a sonotrode in an ultrasonic welding method or a pressing means in a laser welding method is used. The assembly is therefore carried out under stress between the visible part and the reinforcement part. These stresses are necessary to overcome the moulding defects (moulded parts have slight geometrical variations) which lead to insufficient contact. These stresses usually generate reversible deformations since these stresses remain within the elastic limit of the material.

The disadvantage encountered in a stressed assembly is the deformation of the visible part after the welding method. This deformation accentuates the appearance defects on the visible part.

In addition, even after release after welding, the reinforcement part tends to return to its initial shape, due to elasticity, and residual mechanical stresses remain in the parts. These stresses mechanically limit the lifetime of the part.

Furthermore, if the visible part and the part to be attached are made from materials having different expansion coefficients, then a differential expansion may occur during assembly or afterwards, when the assembly is used on a vehicle. Consequently, stresses appear at the weld points, which may lead to deformation or even separation of the parts.

These disadvantages are even more important if the part is long, for example a spoiler on a tailgate or a motor vehicle body, or a bumper lining on its skin, or a tailgate lining on its skin.

The invention aims to remedy these disadvantages by providing a part to be attached by welding to a bodywork element, which preserves the aesthetic appearance of the visible bodywork element receiving the plastic part to be welded, while improving the mechanical properties (impact and/or differential expansion and/or residual stresses).

Thus, the object of the invention concerns a part of a motor vehicle made from plastic material, comprising at least one wall intended to be welded to a bodywork element, said wall comprising at least one protruding element defining a weld surface intended to form a point of contact with said bodywork element. The part comprises around said protruding element at least one stress relief area for relieving stresses experienced by the protruding element.

According to the invention, a flexibility area is therefore added, which generates a local angular freedom on a reinforcement element (the part), which is contrary to trade recommendations. However, this solution not only limits the appearance defects, but improves the mechanical strength of the assembly.

Furthermore, the local flexibility of the part facilitates the contact for the welding operation.

An additional advantage of this part is the reduction of material achieved on this part if the flexibility is obtained by a recess of material made during moulding.

The part may further comprise one or more of the following characteristics, taken alone or in combination:
- the stress relief area is a flexible area of the wall, configured to relieve the stresses in the three dimensions in space;
- the stress relief area comprises at least one flexibility element, chosen alone or in combination from at least one of the following elements: a smaller cross-section than the local cross-section of the wall, a recess of material, a cutout, a portion made from a material that is more flexible than the local material of the wall;
- the flexibility element substantially forms a ring around the protruding element;
- the stress relief area comprises several flexibility elements distributed around the protruding element;
- the protruding element locally forms a protrusion of height approximately 1.5 mm;
- the part is made from one of the following materials: polypropylene (PP), polycarbonate-acrylonitrile butadiene styrene (PC-ABS), acrylonitrile styrene acrylate (ASA).

The invention also concerns an assembly of a bodywork element and a part according to the invention. The assembly may further comprise one or more of the following characteristics, taken alone or in combination:
- the bodywork element is made from one of the following materials: polypropylene (PP), polycarbonate-acrylonitrile butadiene styrene (PC-ABS), acrylonitrile butadiene styrene (ABS);
- the assembly forms a bodywork part of a motor vehicle;
- the assembly is a tailgate, a bumper;
- the assembly is a spoiler, the bodywork element is a spoiler outer surface, and the part is a spoiler reinforcement.

The invention will be better understood on reading the accompanying figures, which are given solely by way of example and not limiting in any way, in which.

Figure 3A:
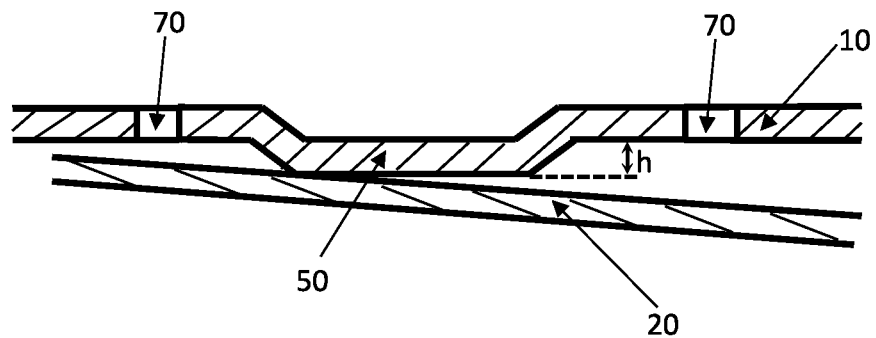
Figure 3B:
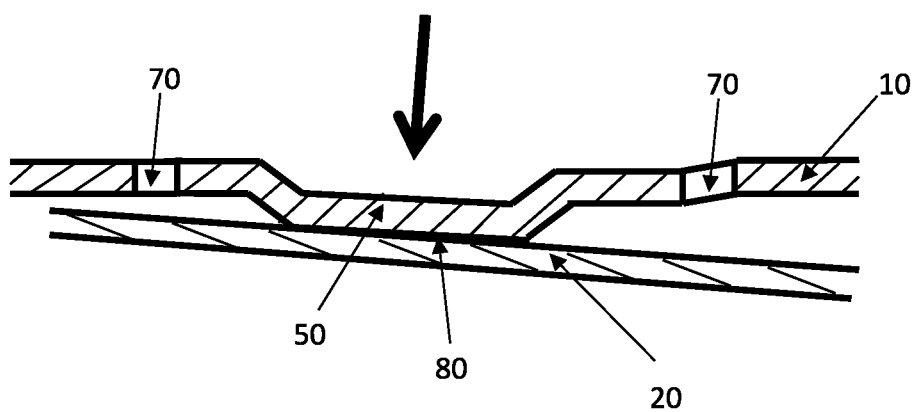

FIGS. 3A and 3B illustrate a detail of a weld area, in cross-section; FIG. 3A illustrates the arrangement of the part and the bodywork element before welding; FIG. 3B illustrates the arrangement of the part and the bodywork element after welding.

Figure 1:
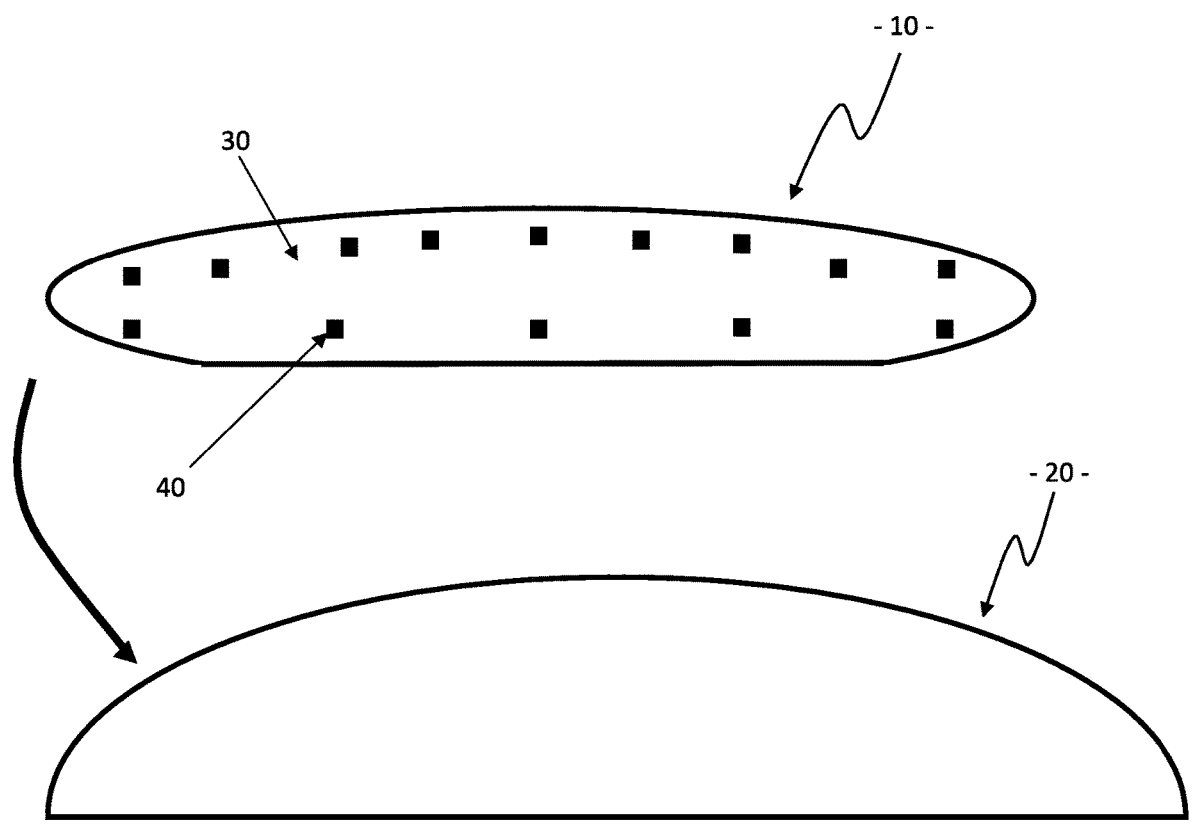
FIG. 1 illustrates an example of a part of a motor vehicle made from plastic material according to the invention, and a bodywork element to which the part is intended to be welded.

We now refer to FIG. 1 which illustrates an example of a part 10 of a motor vehicle made from plastic material according to the invention, and a bodywork element 20 to which the part 10 is intended to be welded. According to the example, it is a spoiler reinforcement intended to be welded to a spoiler outer surface to form a spoiler. The part 10 comprises at least one wall 30 intended to be welded to the bodywork element 20.

The part 10 can be made from one of the following materials: polypropylene (PP), polycarbonate-acrylonitrile butadiene styrene (PC-ABS), acrylonitrile styrene acrylate (ASA), acrylonitrile butadiene styrene (ABS).

Figure 2A:
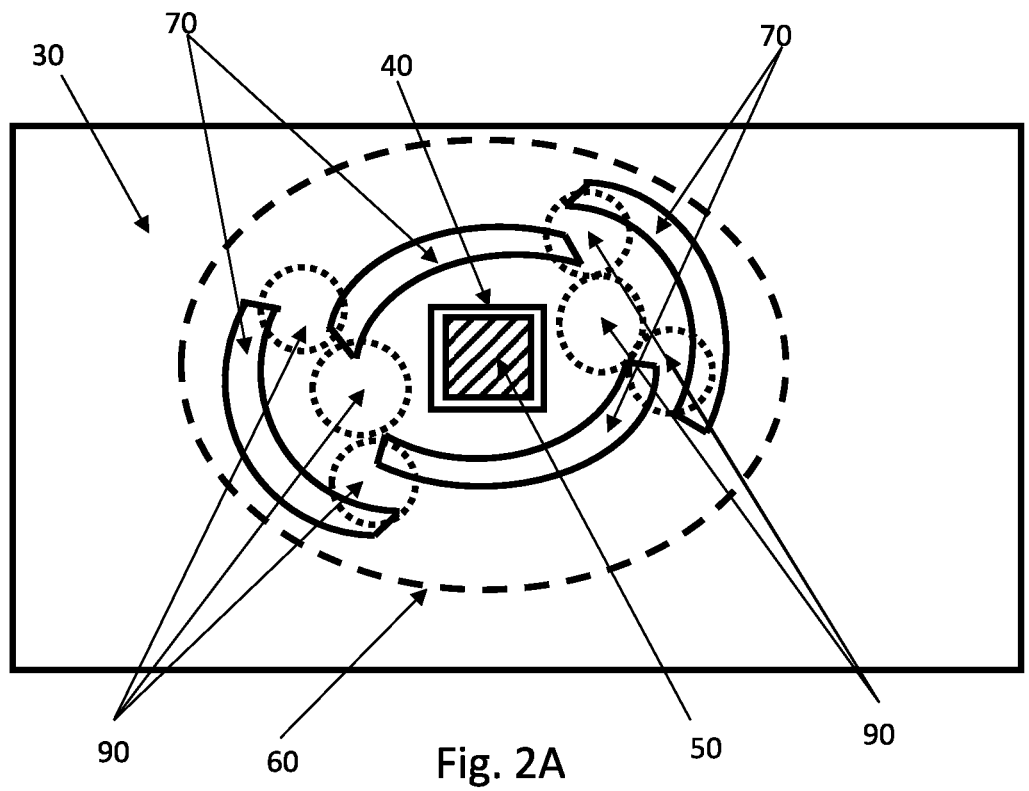
FIG. 2A illustrates a particular embodiment, in which the stress relief area comprises four flexibility elements, from the circular arc-shaped openings, arranged so as to substantially form a ring around the protruding element.
Figure 2B:
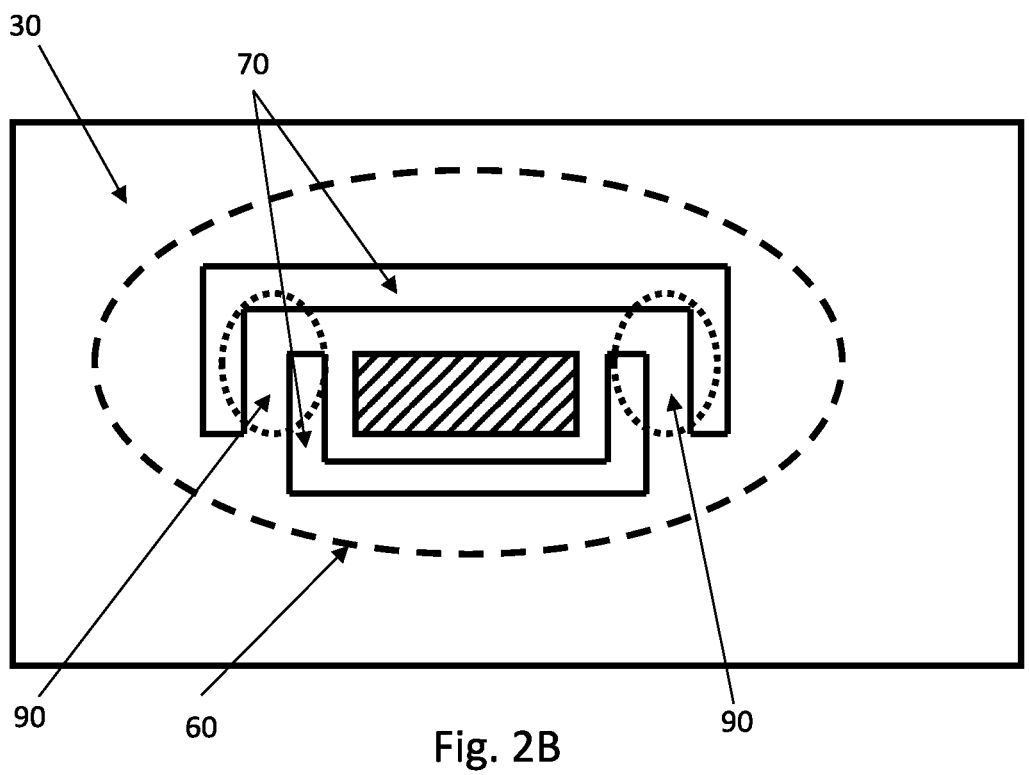
FIG. 2B illustrates another particular embodiment, in which the stress relief area comprises two flexibility elements, from the U-shaped openings, arranged so as to substantially form a ring around the protruding element.

We now refer to FIG. 2A which illustrates a detail of the part 10 of a motor vehicle and we also refer to FIG. 2B which illustrates a design alternative of the same detail of the part 10 of a motor vehicle. The wall 30 comprises at least one protruding element 40 defining a welding surface intended to form a point of contact 50 with the bodywork element 20. The protruding element 40 forms a protrusion, for example having a height "h" between 0.1 and 5 mm (measurement taken between the two planes, see FIG. 3A) for a nominal thickness of the part 10 of 2.4 to 3.8 mm. This protrusion allows freedom of movement of the part 10. The welding area 50 has a thickness of 1.0 to 3.8 mm.

The part 10 generally comprises a set of protruding elements 40, in order to weld the part 10 to the bodywork element 20.

The part 10 comprises around this protruding element 40 at least one stress relief area 60 for relieving stresses experienced by the protruding element 40. Preferably, this area 60 relieves the stresses in the three dimensions in space.

The "stress relief area" designates an area of the wall 30 used to relieve at least some of the stresses experienced by the protruding element 40. These stresses may be due to:
  the pressure applied to press the part 10 and the bodywork element 20 against each other during the welding operation;
  a differential expansion between the part 10 and the bodywork element 20 once welded together.

According to one embodiment, the stress relief area 60 is a flexible area of the wall 30, configured to relieve the stresses in the three dimensions in space. Due to its flexibility, this area allows the point of contact to move in all directions (angular flexibility).

The flexibility of the stress relief area 60 is obtained by providing the wall 30 locally with flexibility elements 70.

These flexibility elements 70 are chosen alone or in combination from the following elements:
  a smaller cross-section than the local cross-section of the wall; to increase the mechanical strength, ribs may be added locally;
  a recess of material; such a recess may be formed when moulding the part 10, or during a rework operation such as punching or machining for example;
  a cutout;
  a portion made from a material more flexible than the local material of the wall.

The position relative to the protruding element 40, the shape and the number of flexibility elements 70 around the welding area, i.e. around the protruding element 40, depend on the required flexibility of the area 60. This shape and this number also depend on the design constraints of the part 10. There could therefore be between 1 and 8 flexibility elements 70 around the protruding element 40. Depending on the moulding constraints and the space available on the part, the shape of the flexibility elements 70 may be different. An element 70 may thus be circular or rectangular, without these shapes being limiting. To ensure good efficiency, the element 70 will be located near the protruding element 40. According to a preferred embodiment, the one or more flexibility elements 70 substantially form a ring around the protruding element 40. If the stress relief area 60 comprises several flexibility elements 70, they are distributed around the protruding element 40.

The flexibility elements 70 also allow "flat spring" type areas 90 to be located inside the stress relief area 60. The material cross-section of the wall 30 is in fact reduced locally by the elements 70 and this stress relief area 60 therefore deforms more easily than the rest of the wall 30.

We now refer to FIGS. 3A and 3B which illustrate a detail of a weld area 80. FIG. 3A illustrates the arrangement of the part 10 and of the bodywork element 20 before welding. We see that the contact between the point of contact 50 and the bodywork element 20 is not sufficient (it is not flat on flat). Pressure must therefore be applied to the part 10 and/or the bodywork element 20. FIG. 3B illustrates the arrangement of the part 10 and of the bodywork element 20 after applying this pressure (the arrow on FIG. 3B shows the direction of this pressure), and after welding. The stresses applied to the protruding element 40 are relieved by the stress relief area 60.

EMBODIMENT

FIG. 2A illustrates a particular embodiment, in which the stress relief area 60 comprises four flexibility elements 70. Each flexibility element 70 is a recess of material in the shape of a comma or circular arc. The flexibility elements 70 have different sizes and are arranged so as to substantially form a ring around the protruding element 40. In this case, there are 6 "flat spring" type areas 90 inside the stress relief area 60.

FIG. 2B illustrates another particular embodiment, in which the stress relief area 60 comprises two flexibility elements 70. Each flexibility element 70 is a U-shaped recess of material. The flexibility elements 70 have different sizes and are arranged so as to substantially form a ring around the protruding element 40. A single U-shaped recess could be considered if it is directed so as to allow angular flexibility in the locally most relevant axis of rotation to place the surfaces in contact and allow welding under good conditions. In this case, there are 2 "flat spring" type areas 90 inside the stress relief area 60. The invention also concerns an assembly of a bodywork element 20 and a part 10 according to the invention. The bodywork element can be made from one of the following materials: polypropylene (PP), polycarbonate-acrylonitrile butadiene styrene (PC-ABS).

According to one embodiment, the assembly forms a bodywork part of a motor vehicle such as a tailgate, a bumper or a spoiler.

In the case of a spoiler for example, the bodywork element 20 is the spoiler outer surface, and the part 10 is the spoiler reinforcement.

The welding method consists of several steps. The reinforcement is positioned against the bodywork part. A stress is applied to press the two parts together at various points, locally. According to the invention, the special design allows the surface to be welded to move so that the plane of the area to be welded is in the plane of the bodywork part, locally, i.e. at the location where the weld will be made.

The overall direction of the reinforcement and of the bodywork part remains unchanged. Welding is then carried out. The stresses applied to the reinforcement and the bodywork part can be released. The residual stresses are reduced by the design according the invention compared with a conventional design. Less material in fact tends to return to its initial shape, so there is less elastic return. Consequently, the bodywork part is less deformed locally by these residual stresses on the welded surface, but it is in particular the local area of the reinforcement which undergoes the deformation. This local area of the reinforcement follows the direction of the wall of the bodywork part more easily due to the freedom of movement provided by the flexibility areas. The local behaviour is similar to that of a flat spring.

LIST OF REFERENCES

10: part of a motor vehicle made from plastic material
20: bodywork element to which the part 10 is intended to be welded
30: wall of the part 10 intended to be welded to the bodywork element 20
40: protruding element 40 of the wall 30
50: area of contact of the protruding element with the bodywork element 20 defining a welding surface
60: stress relief area for relieving stresses experienced by the protruding element 40
70: flexibility element of the stress relief area 60
80: weld area
90: "flat spring" type area of the stress relief area 60

The invention claimed is:

1. Part of a motor vehicle made from plastic material, comprising at least one wall to be welded to a bodywork element, said wall comprising at least one protruding element defining a weld surface to form a point of contact with said bodywork element, wherein the part comprises, around said protruding element, at least one stress relief area for relieving stresses experienced by the protruding element.

2. Part according to claim 1, wherein the stress relief area is a flexible area of the wall, configured to relieve the stresses in the three dimensions in space.

3. Part according to claim 1, wherein the stress relief area comprises at least one flexibility element, chosen alone or in combination from at least one of the following elements: a smaller cross-section than a local cross-section of the wall, a recess of material, a cutout, and a portion made from a material that is more flexible than a local material of the wall.

4. Part according to claim 3, wherein the at least one flexibility element forms a ring around the protruding element.

5. Part according to claim 4, wherein the stress relief area comprises several flexibility elements distributed around the protruding element.

6. Part according to claim 1, wherein the protruding element locally forms a protrusion of height approximately 1.5 mm.

7. Part according to claim 1, wherein the part is made from one of the following materials: polypropylene (PP), polycarbonate-acrylonitrile butadiene styrene (PC-ABS), and acrylonitrile styrene acrylate (ASA).

8. Part according to claim 1, wherein the at least one protruding element comprises at least three protruding elements.

9. Part according to claim 3, comprising at least two flexibility elements.

10. Part according to claim 9, wherein each of the at least two flexibility elements have a circular arc shape and the at least two flexibility elements are arranged to substantially form a ring around the protruding element.

11. Part according to claim 9, wherein each of the at least two flexibility elements have a U-shape and the at least two flexibility elements are arranged to substantially form a ring around the protruding element.

12. Part according to claim 11, wherein at least one of the at least two flexibility elements is a different size than at least one other of the at least two flexibility elements.

13. An assembly comprising a bodywork element and a part according to claim 1.

14. Assembly according to claim 13, wherein the bodywork element is made from one of the following materials: polypropylene (PP), polycarbonate-acrylonitrile butadiene styrene (PC-ABS), acrylonitrile butadiene styrene (ABS).

15. Assembly according to claim 13, forming a bodywork part of a motor vehicle.

16. Assembly according to claim 15, wherein the assembly is a tailgate.

17. Assembly according to claim 15, wherein the assembly is a spoiler, the bodywork element is a spoiler outer surface, and the bodywork part is a spoiler reinforcement.

18. Assembly according to claim 15, wherein the assembly is a bumper.

19. Assembly according to claim 13, wherein the protruding element is bonded to the bodywork part.

20. Assembly according to claim 13, wherein the bodywork element is welded to the part.

* * * * *